US010421252B2

(12) United States Patent
O'Ryan

(10) Patent No.: US 10,421,252 B2
(45) Date of Patent: Sep. 24, 2019

(54) THERMALLY INSULATING GLASS LAMINATES WITH A NON-UNIFORM COATING LAYER AND A PLURALITY OF SEALED CAVITIES OF GAS MOLECULES

(71) Applicant: Schott Gemtron Corp., Sweetwater, TN (US)

(72) Inventor: Adam O'Ryan, Sweetwater, TN (US)

(73) Assignee: SCHOTT GEMTRON CORP., Sweetwater, TN (US)

( * ) Notice: Subject to any disclaimer, the term of this patent is extended or adjusted under 35 U.S.C. 154(b) by 191 days.

(21) Appl. No.: 15/425,604

(22) Filed: Feb. 6, 2017

(65) Prior Publication Data
US 2018/0222155 A1    Aug. 9, 2018

(51) Int. Cl.
*F24C 15/04*    (2006.01)
*B32B 7/10*    (2006.01)
(Continued)

(52) U.S. Cl.
CPC .............. *B32B 17/06* (2013.01); *A21B 3/02* (2013.01); *B32B 7/10* (2013.01); *B32B 7/14* (2013.01);
(Continued)

(58) Field of Classification Search
CPC . F24C 15/04; Y02B 80/22; E06B 3/66; E06B 3/6715; B32B 17/06; B32B 7/10;
(Continued)

(56) References Cited

U.S. PATENT DOCUMENTS 3,188,912 A  *  6/1965  Wrench .................... E04C 2/54
                                                  359/597
3,451,389 A  *  6/1969  Huff ...................... F24C 15/022
                                                  126/197
(Continued)

FOREIGN PATENT DOCUMENTS

DE        19906774        8/2000
GB        2531548         4/2016
(Continued)

OTHER PUBLICATIONS

International Search Report dated Mar. 23, 2018 for corresponding PCT/US2018/016881, 2 pages.
(Continued)

*Primary Examiner* — Donald J Loney
(74) *Attorney, Agent, or Firm* — Ohlandt, Greeley, Ruggiero & Perle, L.L.P.

(57) ABSTRACT

The present disclosure describes thermally insulating glass laminates that mitigate or prevent heat loss from heated cavities. In some embodiments, the thermally insulating glass laminates comprise a non-uniform low or non-conductive coating layer that forms a chemical bond with at least one inner surface of the substrates, wherein the coating layer can have a thickness of about 0.010 inches or less and forms a pattern that contacts about 30% or less of at least one inner surface of a substrate and helps form a plurality of sealed cavities of gas molecules between the substrates. Since there is a small amount of gas molecules in each cavity, convective heat transfer between the substrates is minimized thereby minimizing heat loss through the laminates into the surrounding environment.

15 Claims, 1 Drawing Sheet

(51) Int. Cl.
*B32B 17/06* (2006.01)
*B32B 37/12* (2006.01)
*B32B 7/14* (2006.01)
*A21B 3/02* (2006.01)
*B32B 3/10* (2006.01)

(52) U.S. Cl.
CPC .............. *B32B 37/12* (2013.01); *F24C 15/04* (2013.01); *B32B 3/10* (2013.01); *B32B 2037/1269* (2013.01); *B32B 2250/02* (2013.01); *B32B 2255/20* (2013.01); *B32B 2305/80* (2013.01); *B32B 2307/304* (2013.01); *B32B 2307/412* (2013.01); *B32B 2315/08* (2013.01); *B32B 2509/00* (2013.01); *E05Y 2900/308* (2013.01); *Y10T 428/24851* (2015.01)

(58) Field of Classification Search
CPC ....... B32B 7/14; B32B 37/12; B32B 2255/20; B32B 2305/80; B32B 2315/08; B32B 3/10; E05Y 2900/308; Y10T 428/24851
See application file for complete search history.

(56) References Cited

U.S. PATENT DOCUMENTS

| | | | |
|---|---|---|---|
| 3,665,915 A * | 5/1972 | Katona | F24C 15/04 126/200 |
| 3,902,883 A * | 9/1975 | Bayer | C03B 23/203 65/43 |
| 3,978,249 A * | 8/1976 | Cooke | C03C 17/09 427/448 |
| 5,315,797 A | 5/1994 | Glover et al. | |
| 5,337,727 A | 8/1994 | Borens et al. | |
| 5,588,421 A | 12/1996 | Busch et al. | |
| 5,657,607 A | 8/1997 | Collins | |
| 6,086,799 A | 7/2000 | Buazza | |
| 6,693,261 B2 | 2/2004 | Leutner | |
| 2003/0044570 A1 | 3/2003 | George | |
| 2004/0164075 A1 | 8/2004 | Henze et al. | |
| 2006/0082700 A1 | 4/2006 | Gehlsen | |
| 2011/0261461 A1 | 10/2011 | Le | |
| 2012/0060822 A1 | 3/2012 | Eberhard | |
| 2013/0011683 A1 | 1/2013 | Busman | |
| 2016/0138324 A1 | 5/2016 | Lameris et al. | |

FOREIGN PATENT DOCUMENTS

| | | |
|---|---|---|
| WO | 03104599 | 12/2003 |
| WO | 2017003787 | 1/2017 |

OTHER PUBLICATIONS

Written Opinion of the International Searching Authority dated Mar. 23, 2018 for corresponding PCT/US2018/016881, 4 pages.

* cited by examiner

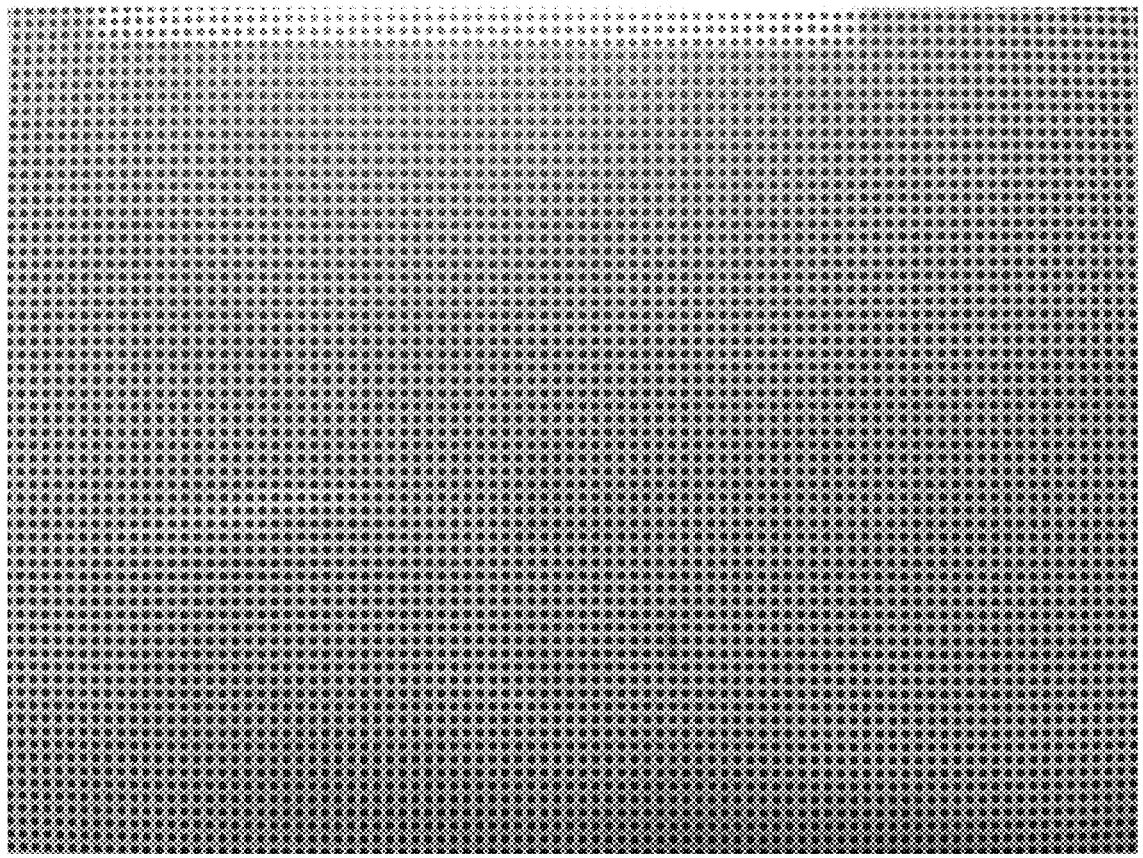

THERMALLY INSULATING GLASS LAMINATES WITH A NON-UNIFORM COATING LAYER AND A PLURALITY OF SEALED CAVITIES OF GAS MOLECULES

BACKGROUND OF THE DISCLOSURE

Field of the Disclosure

The present disclosure relates to thermally insulating glass laminates.

Description of the Related Art

Glass laminates are used in high temperature applications as windows and site glasses for the purpose of viewing a heated cavity. To minimize heat loss from the cavity, the laminates have multiple panes of glass with a gap between the panes to prevent direct heat transfer from the cavity to the outer pane, but the temperature of the outer pane still increases and heat escapes into the surrounding environment because of convective heat transfer through air in the gap between the panes. Heat insulating coatings have been used to prevent heat loss but many coatings are inadequate.

SUMMARY OF THE DISCLOSURE

The present disclosure describes thermally insulating glass laminates that mitigate or prevent heat loss from heated cavities. In some embodiments, the thermally insulating glass laminates comprise a non-uniform low or non-conductive coating layer that forms a chemical bond with at least one inner surface of the substrates, where the coating layer can have a thickness of about 0.010 inches or less. In some embodiments, the non-uniform low or non-conductive coating layer helps form a plurality of sealed three-dimensional cavities between the substrates each having a very small volume with a small amount of gas molecules therein. Since there is a small amount of gas molecules in each cavity, convective heat transfer between the substrates is minimized thereby minimizing heat loss through the laminates and into the surrounding environment.

Some current literature suggests that thermally insulating glass laminates are optimal insulators when the gas cavity has a thickness of about 15 millimeters, where thinner cavities have increased conduction losses and thicker cavities have increased convection losses. This knowledge suggests that decreasing the thickness of the cavity would increase conduction losses, but conduction losses are not increased in the current disclosure.

The thermally insulating glass laminates of the disclosure can be used, in one non-limiting example, in high temperature applications such as windows and site glasses in residential and commercial ovens and applications having heated cavities where low heat loss and cool outlet window temperatures are desired. In some embodiments, the high temperature applications are above about 175° C.

In one embodiment, the present disclosure provides a thermally insulating laminate comprising a first glass substrate having an inner surface, a second glass substrate having an inner surface, and a non-uniform low or non-conductive coating layer that forms a chemical bond with at least one inner surface. The coating layer has a thickness of about 0.010 inches or less and forms a pattern that contacts about 30% or less of the at least one inner surface. A plurality of sealed cavities of gas molecules exists between the substrates.

BRIEF DESCRIPTION OF THE DRAWINGS

FIG. 1 illustrates a portion of a laminate having a plurality of circular-shaped cavities formed using a non-uniform coating layer that contacts about 30% or less of at least one inner surface of the substrates.

DETAILED DESCRIPTION OF THE DISCLOSURE

The present disclosure describes thermally insulating glass laminates that mitigate or prevent heat loss from heated cavities. In some embodiments, the thermally insulating glass laminates comprise a first glass substrate having an inner surface, a second glass substrate having an inner surface, and a non-uniform low or non-conductive coating layer that forms a chemical bond with at least one inner surface, wherein the non-uniform low or non-conductive coating layer has a thickness of about 0.010 inches or less and forms a pattern that contacts about 30% of less of at least one inner surface, and wherein a plurality of sealed cavities of gas molecules exists between the substrates.

The plurality of sealed cavities of gas molecules may comprise in some embodiments without limitation about 5 to about 400, about 100 to about 400, or about 5 to about 50 cavities per square centimeter of the coating layer. The width of the coating measured between each cavity may be without limitation less than about 0.5, about 0.01 to about 0.5, or about 0.02 to about 0.1 millimeters. The coating layer should prevent the substrates from touching. One of the purposes of the coating layer is to provide spacing between the substrates to trap gas molecules in the plurality of sealed cavities between the substrates.

In some embodiments, the conductivity of the coating layer is about 5 W/(m·K) or less, or about 3.5 W/(m·K) or less. In some embodiments, the conductivity of the coating layer is lower than the conductivity of the substrates that contact the coating composition. For purposes of the current disclosure, a "low conductive" coating layer has a conductivity of about 5 W/(m·K) or less and a "non-conductive" coating layer has a conductivity of 0 or about 0 W/(m·K).

The coating layer creates an insulating layer between the substrates to minimize convective currents and reduce heat transfer between the substrates. In some embodiments, the coating layer is a low or non-conductive coating layer formed from a coating composition, such as in one non-limiting example an enamel, a frit, or a combination thereof, each comprising a ceramic compound, a glass compound or a combination thereof, optionally with other compounds, some of which may evaporate when curing the coating composition to form the coating layer. In certain embodiments, the ceramic and glass compounds in the coating layer have a similar composition and thermal expansion properties compared to the substrate that contacts the coating layer.

The coating composition may comprise a frit, which is a mixture of inorganic chemical substances produced by rapidly quenching a molten, complex combination of materials, and confining the chemical substances thus manufactured as non-migratory components of glassy solid flakes or granules. Frits include in one non-limiting example all of the chemical substances specified below when they are intentionally manufactured in the production of the frit. The primary members include without limitation oxides of some or all of the elements listed below, where fluorides of these elements may also be included: aluminum, antimony, arsenic, barium, bismuth, boron, cadmium, calcium, cerium, chromium, cobalt, copper, gold, iron, lanthanum, lead, lithium, magnesium, manganese, molybdenum, neodymium, nickel, niobium, phosphorus, potassium, silicon, silver, sodium, strontium, tin, titanium, tungsten, vanadium, zinc, zirconium, and combinations thereof. The most common frits are bismuth and zinc based frits. The frits may comprise pigments added in small percentages for color purposes.

A non-limiting example of a suitable coating composition is:
Crystalline Silica: 11-15%
Borates: 19-22%
Zinc Oxide: 25-29%
Titanium Dioxide: 32-36%
Manganese Compound: 0-2%
Iron Oxide: 0-2%
Chromium Compound: 0-2%
Cobalt Compound: 0-3%
Alumina: 3-6%

Another non-limiting example of a suitable coating composition is:
Crystalline Silica: 34-38%
Borates: 8-12%
Zinc Oxide: 16-20%
Titanium Dioxide: 5-9%
Manganese Compound: 0-3%
Iron Oxide: 0-3%
Chromium Compound: 11-15%
Copper Compound: 8-12%

The non-uniform coating layer may be applied to the substrate by silk screening or any other suitable technique. As shown in FIG. 1, the non-uniform coating layer has voids and does not contact the entire surface of the substrate. The non-uniform coating layer can form a regular or irregular pattern. When silk screening for example, the coating composition is injected through the screen to form the pattern. The patterned and non-uniform coating composition helps form a plurality of sealed cavities of gas molecules between the substrates. The coating layer may be transparent or colored. Intermediate layers, additional substrates and additional coating layers may be present as desired.

The laminates may be formed by chemically bonding the coating layer to at least one of the substrates in any manner known to those skilled in the art. For a non-limiting example, the laminates may be formed by steps comprising applying the coating composition to a first substrate, heating the coating composition to adhere the coating composition to the first substrate, applying a second substrate on the heated coating composition, and firing the heated coating composition to form a chemical bond between the coating layer and at least one of the substrates. In other embodiments, the laminates are formed by steps comprising applying the coating composition to a first substrate, applying a second substrate on the coating composition, then firing the coating composition to form a chemical bond between the coating layer and at least one of the substrates. In all embodiments, at least one of the coating layers, the first substrate and the second substrate may form a chemical bond with at least one of the others.

The coating layers of the disclosure, at least the coating layer that touches the substrate, is pyrolytic because the coating layer is chemically bonded to the substrate by sharing an oxygen atom and becoming part of the Si—O—X chain. Pyrolytic coatings are "hard" coatings and differ from "soft" coatings like paint that are mechanically adhered to a substrate. Pyrolytic coatings compared to adhered coatings have superior wear resistance, do not easily scratch off, and typically do not require protective topcoats. The pyrolytic coatings of the disclosure can be applied in any manner known to those skilled in the art, such as by deposition using a high temperature plasma process or silk screening.

The term "glass" as used herein includes glass and glass-ceramics, including but not limited to soda lime, borosilicate, lithium aluminosilicate, and combinations thereof. The term "substrate" signifies a platform to which the coatings described herein and other elements can be applied. The substrates are not limited in shape. The substrates may be flat, curved, concave or convex, and may have rectangular, square or other dimensions. In some embodiments, the substrate comprises a glass material and have a thickness of about 1 to about 10 mm or about 2 to about 5 mm.

The coating layer is non-uniform because it does not cover the entire surface area of a substrate. Instead, the non-uniform coating layer is distributed in a pattern that helps form a plurality of sealed cavities of gas molecules between the substrates. The pattern may comprise many segments of coating connected in a grid-like manner to surround the plurality of cavities. The cavities are essentially voids that gas molecules can occupy without substantial movement. The shape of the cavities is not critical. The cavities may be in the form of honeycombs, circles or any other shapes that produces a plurality of three-dimensional gas-filled voids between the two substrates and segments of coating between the voids. FIG. 1 illustrates a portion of a laminate having a plurality of circular-shaped cavities and a non-uniform and patterned coating layer that contacts about 30% or less of at least one of inner surface of the substrates.

In some embodiments, the coating layer has a thickness of about 0.010 inches or less, about 0.005 inches or less, or about 0.001 inches or less. It is desirable to form a coating layer having such a small thickness and to use a low or non-conductive coating composition to minimize conductive heat transfer. In some embodiments, the non-uniform coating layer is distributed across a majority of the substrates and forms a pattern that contacts about 30% or less of at least one inner surface of the substrates, about 20% or less of at least one inner surface of the substrates, or about 10% or less of at least one inner surface of the substrates (in other words, the cavities/voids contact about 70% or more, about 80% or more, or about 90% or more of at least one inner surface of the substrates). The non-uniform coating layer at these small thicknesses helps produce a plurality of sealed three-dimensional cavities each having a very small volume with a small amount of gas molecules therein. Since there is a small amount of gas molecules in each cavity, convective heat transfer between the substrates is minimized thereby minimizing heat loss through the laminates into the surrounding environment. The cavities essentially act as thermal insulators. The gas can be air or an inert gas. In some embodiments, there is a partial or complete vacuum in the cavities. In other embodiments, there is no vacuum.

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure. The ranges disclosed herein include all subranges therebetween.

The invention claimed is:

1. A thermally insulating laminate comprising:
   a first glass substrate having an inner surface;
   a second glass substrate having an inner surface; and
   a non-uniform low or non-conductive coating layer between the first glass substrate and the second glass substrate that forms a chemical bond with at least one of the inner surfaces,
   wherein the coating layer has a thickness of about 0.010 inches or less, and comprises a plurality of interconnected segments with a plurality of voids, and
   wherein the inner surface of the first glass substrate, the inner surface of the second glass substrate, the coating layer, and the voids define a plurality of sealed cavities between the substrates.

2. The laminate of claim 1, wherein there are about 5 to about 400 cavities per square centimeter of the coating layer.

3. The laminate of claim 1, wherein a width of the coating layer measured between each cavity is about 0.01 to about 0.5 millimeters.

4. The laminate of claim 1, wherein the thickness of the coating layer is about 0.005 inches or less.

5. The laminate of claim 1, wherein the thickness of the coating layer is about 0.001 inches or less.

6. A method of forming the laminate of claim 1, comprising the steps of:
   applying a coating composition to the first substrate;
   heating the coating composition to adhere the coating composition to the first substrate;
   applying the second substrate on the heated coating composition; and
   firing the heated coating composition to form the chemical bond.

7. A method of forming the laminate of claim 1, comprising the steps of:
   applying a coating composition to the first substrate;
   applying the second substrate on the coating composition; and
   firing the coating composition to form the chemical bond.

8. The laminate of claim 1, wherein the coating layer comprises an enamel, a frit, or a combination thereof, and wherein the enamel, frit, or combination thereof comprises a ceramic compound, a glass compound or a combination thereof.

9. The laminate of claim 1, wherein the coating layer is transparent.

10. The laminate of claim 1, wherein the coating layer has a conductivity lower than a conductivity of the first and second substrates.

11. The laminate of claim 1, wherein there is no vacuum in the cavities.

12. An oven comprising the laminate of claim 1, wherein the oven operates at a temperature above about 175° C.

13. The oven of claim 12, wherein a window or site glass of the oven comprises the laminate.

14. The laminate of claim 1, wherein the chemical bond is a Si—O bond.

15. The laminate of claim 1, wherein the voids comprise about 30% or less of the coating layer.

* * * * *